US008816254B2

(12) United States Patent
Zoucha

(10) Patent No.: US 8,816,254 B2
(45) Date of Patent: Aug. 26, 2014

(54) APPARATUS FOR COOKING OR HEATING FOOD OR LIQUIDS

(76) Inventor: James Zoucha, Orchard, NE (US)

(*) Notice: Subject to any disclaimer, the term of this patent is extended or adjusted under 35 U.S.C. 154(b) by 292 days.

(21) Appl. No.: 13/532,153

(22) Filed: Jun. 25, 2012

(65) Prior Publication Data

US 2013/0341317 A1 Dec. 26, 2013

(51) Int. Cl.
*A21B 1/22* (2006.01)
*F24C 15/36* (2006.01)

(52) U.S. Cl.
USPC ............................. 219/411; 126/201; 219/429

(58) Field of Classification Search
CPC .............. A21B 1/22; A21B 1/48; A21B 2/00; F24H 3/00; F24H 3/006; F24H 9/00; F24H 9/0094; F24H 9/20; F24H 9/2085; F24C 3/065; F24C 3/067; F24C 7/043; F24C 7/046; A47J 37/044
USPC ............. 219/411, 429–30, 432, 450.1, 451.1, 219/452.11, 452.12, 453.11, 453.12; 126/201
See application file for complete search history.

(56) References Cited

U.S. PATENT DOCUMENTS

| 4,089,258 A | 5/1978 | Berger |
| 4,421,015 A | 12/1983 | Masters et al. |
| 6,276,356 B1 | 8/2001 | Ragland et al. |
| 6,732,637 B2 | 5/2004 | Artt |

*Primary Examiner* — Shawntina Fuqua
(74) *Attorney, Agent, or Firm* — Dennis L. Thomte; Thomte Patent Law Office LLC

(57) ABSTRACT

The apparatus of this invention relates to a device for heating or cooking food or liquids such as soup, water, roast, etc. A downwardly curved visor-like deflector is positioned at the upper end of a radiation disk of an infrared heater so as to extend outwardly therefrom. The deflector has an upwardly presented cooking utensil opening formed therein and a horizontally disposed cooking utensil support secured to the deflector at the inner surface thereof below the cooking utensil opening. The cooking utensil support dwells in a plane below the upper end of the radiation disk whereby infrared rays emitted from the radiation disk will impinge upon the cooking utensil support and a cooking utensil positioned on the cooking utensil support to cook or heat the contents thereof.

11 Claims, 5 Drawing Sheets

APPARATUS FOR COOKING OR HEATING FOOD OR LIQUIDS

BACKGROUND OF THE INVENTION

1. Field of the Invention

This invention relates to an apparatus for heating or cooking food or liquids such as soup, water, etc. The invention may also be used to cook food such as roast, etc. Even more particularly, the apparatus of this invention includes an infrared heater having a visor or deflector secured to the upper discharge end of the infrared heater with the visor or deflector having a pot or kettle support provided thereon.

2. Description of the Related Art

Many attempts have been previously provided for cooking foods by way of radiant heat. For example, see U.S. Pat. Nos. 4,089,258; 4,421,015; 6,276,356; and 6,732,637. Although the devices of the prior art may cook food with radiant heat, the prior art devices seem to be very complicated and expensive. Further, it is not believed that the prior art methods of cooking foods are convenient to use and perhaps do not perform the cooking operation in a satisfactory manner. Further, the prior art devices do not provide an attachment which may be connected to and supported by a conventional infrared radiant heater such as those infrared radiant heaters of the Val6 Series manufactured by Shizouka Seika Co., Ltd., having an address of 4-1 Yamana, Fukuroi-shi, Shizouka-ken, Japan 437-8601.

In Applicant's earlier patent application, an improved apparatus was disclosed for cooking food such as meat, seafood, chicken, etc. The instant invention is believed to be an additional way of cooking or heating food or liquids.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An apparatus is disclosed for heating or cooking food or for heating liquids such as soup or water. The apparatus is designed to be used with an infrared radiant heater having a discharge end from which infrared rays are emitted therefrom. The apparatus includes a downwardly curved visor-like deflector positioned at the upper end of the radiation disk of the heater and which extends outwardly therefrom. The deflector has inner and outer surfaces. The deflector has an upwardly presented cooking utensil opening formed therein. The deflector also has a horizontally disposed cooking utensil support secured to the deflector at the inner surface thereof below the cooking utensil opening. The cooking utensil support dwells in a plane below the upper end of the radiation disk of the heater whereby infrared rays being emitted from the radiation disk will impinge upon the cooking utensil support at the cooking utensil to cook or heat the contents of the cooking utensil positioned on the cooking utensil support.

It is therefore a principal object of the invention to provide an improved apparatus for cooking or heating food or liquids.

A further object of the invention is to provide a visor-like deflector which is attached to the upper end of the radiation disk of an infrared heater with the deflector having a cooking utensil opening formed therein and a cooking utensil support secured to the underside of the deflector below the cooking utensil opening.

A further object of the invention is to provide an apparatus of the type described which ensures that the food or liquids being cooked or heated will be quickly and easily heated or cooked with a minimum amount of time.

A further object of the invention is to provide an apparatus for heating or cooking food or liquids which is easily secured to a conventional infrared heater at the discharge side thereof above the radiation disk of the heater.

A further is to provide an apparatus for cooking or heating food or liquids which is economical of manufacture, durable in use and refined in appearance.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
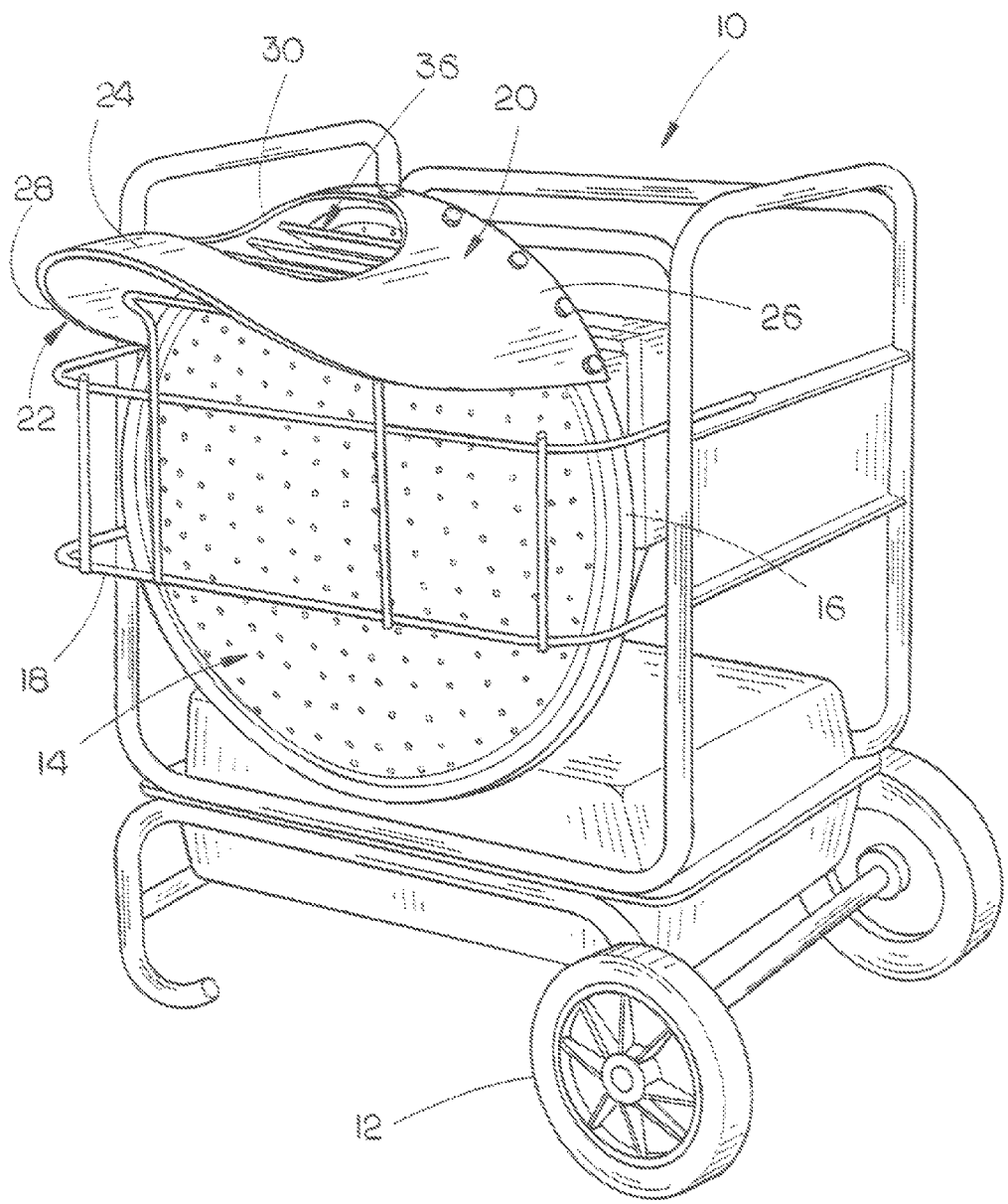
FIG. 1 is a prospective view of this invention mounted on an infrared heater.
Figure 2:
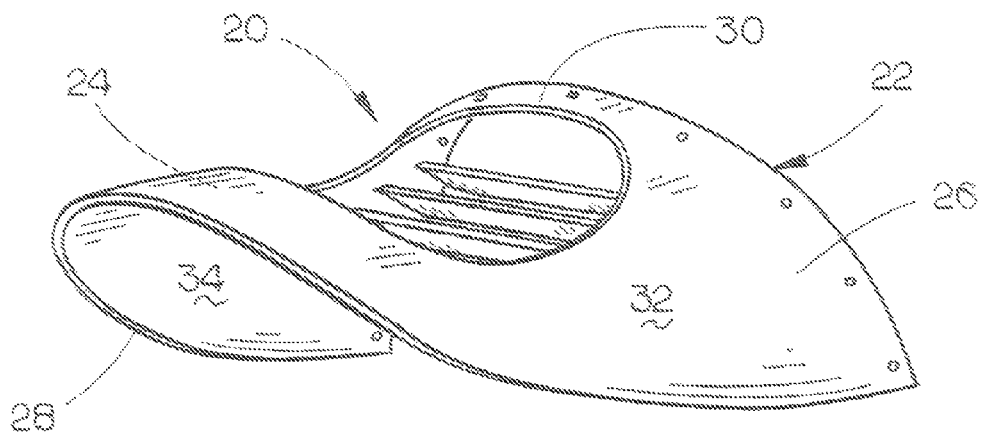
FIG. 2 is a perspective view of the apparatus of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to an infrared heater such as the Val6 Series heater manufactured and sold by Shizouka Seika Co., Ltd., having an address of 4-1 Yamana, Fukuroi-shi, Shizouka-ken, Japan 437-8601. The infrared heater 10 is diesel-fuel-fired and is mounted on a wheeled frame 12. Heater 10 includes a radiation disk 14 which emits infrared rays therefrom in conventional fashion. Disk 14 is mounted on the discharge end of a heating cone 16. The number 18 refers to a grill guard positioned outwardly of the radiation disk 14.

Figure 3:
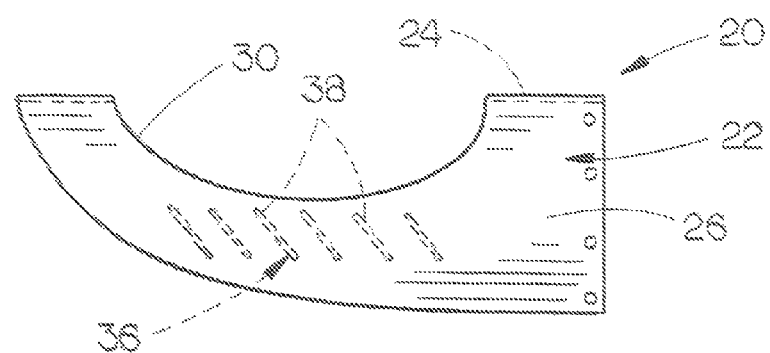
FIG. 3 is a side elevational view of the apparatus of this invention.
Figure 4:
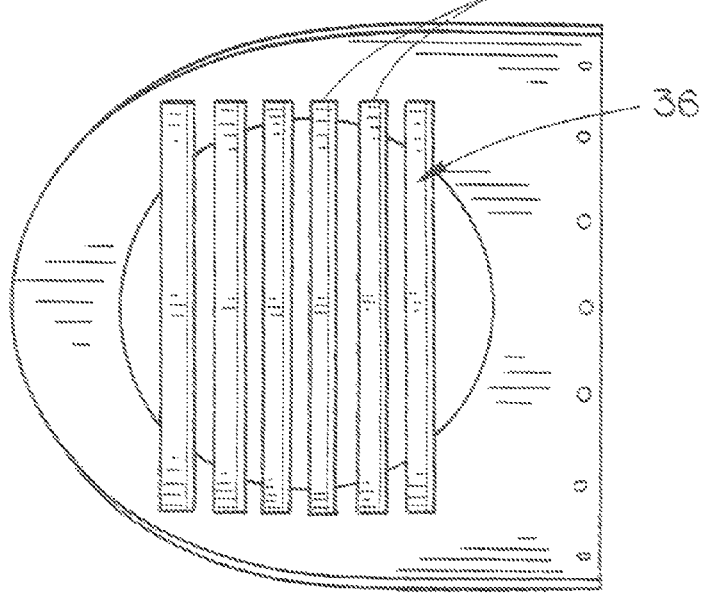
FIG. 4 is a bottom view of the apparatus of this invention.
Figure 5:
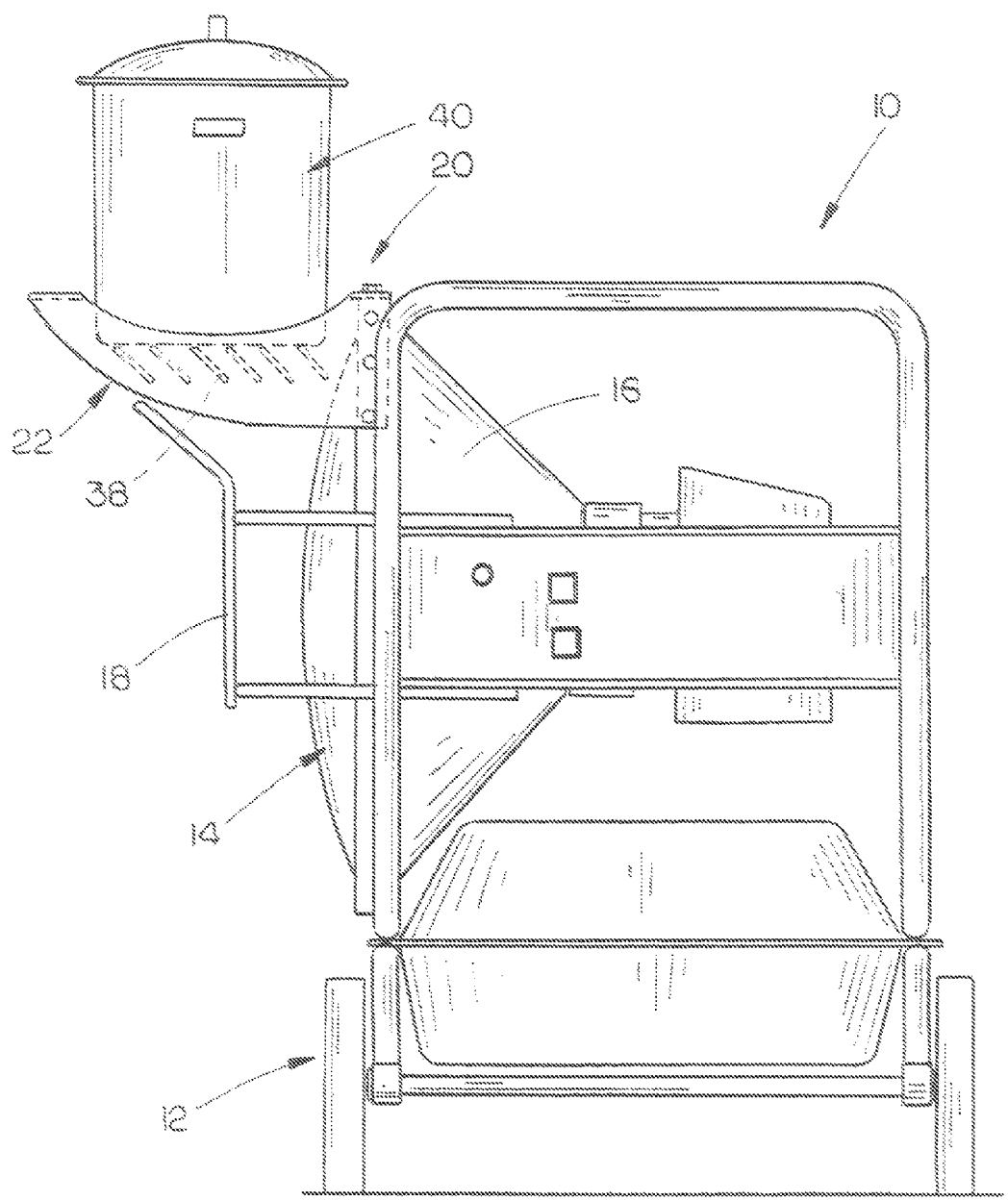
FIG. 5 is a side elevational view of the apparatus of this invention having a cooking utensil positioned thereon.
Figure 6:
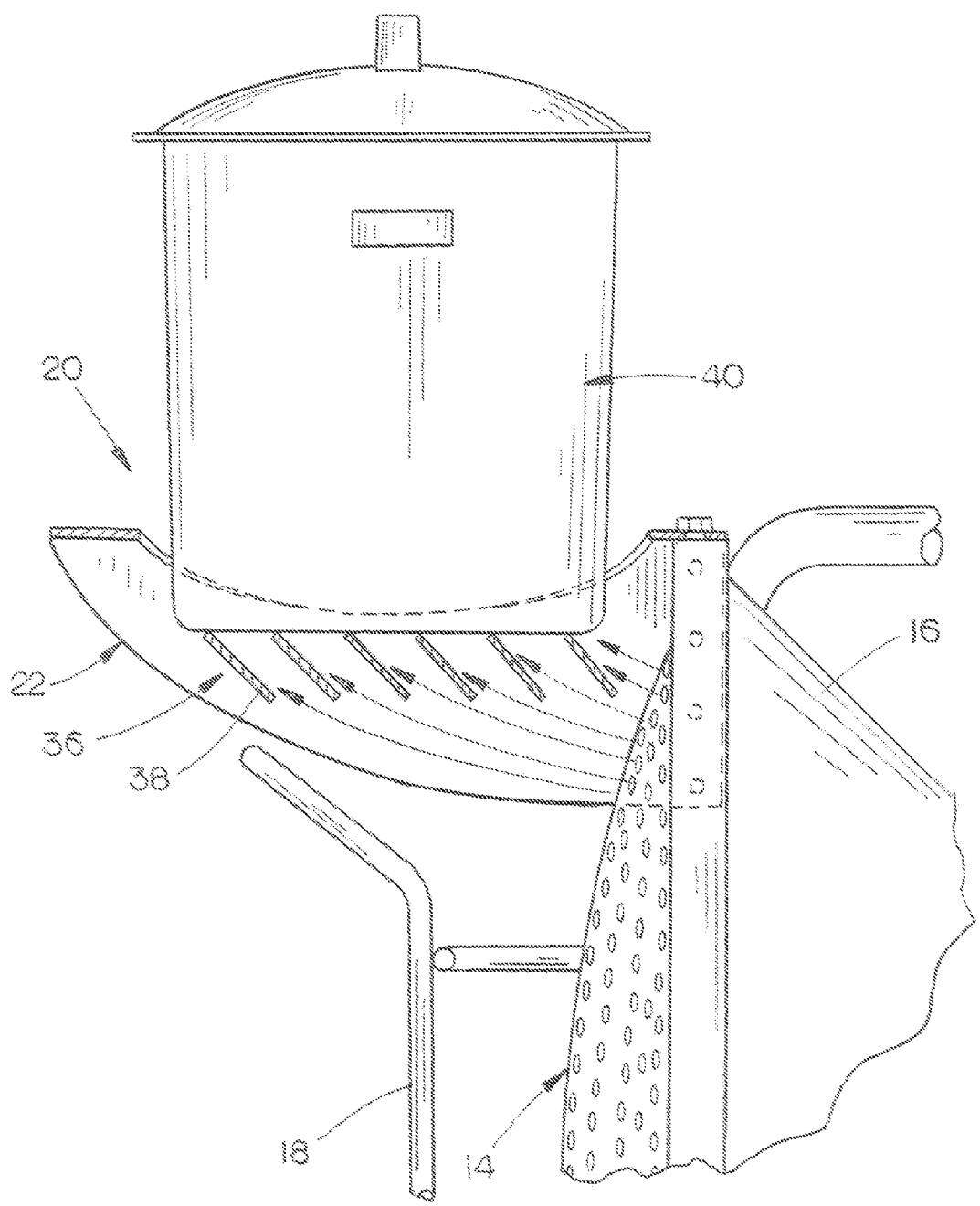
FIG. 6 is a partial sectional view illustrating the manner in which the contents of a cooking utensil are heated or cooked with the apparatus of this invention.
Figure 7:
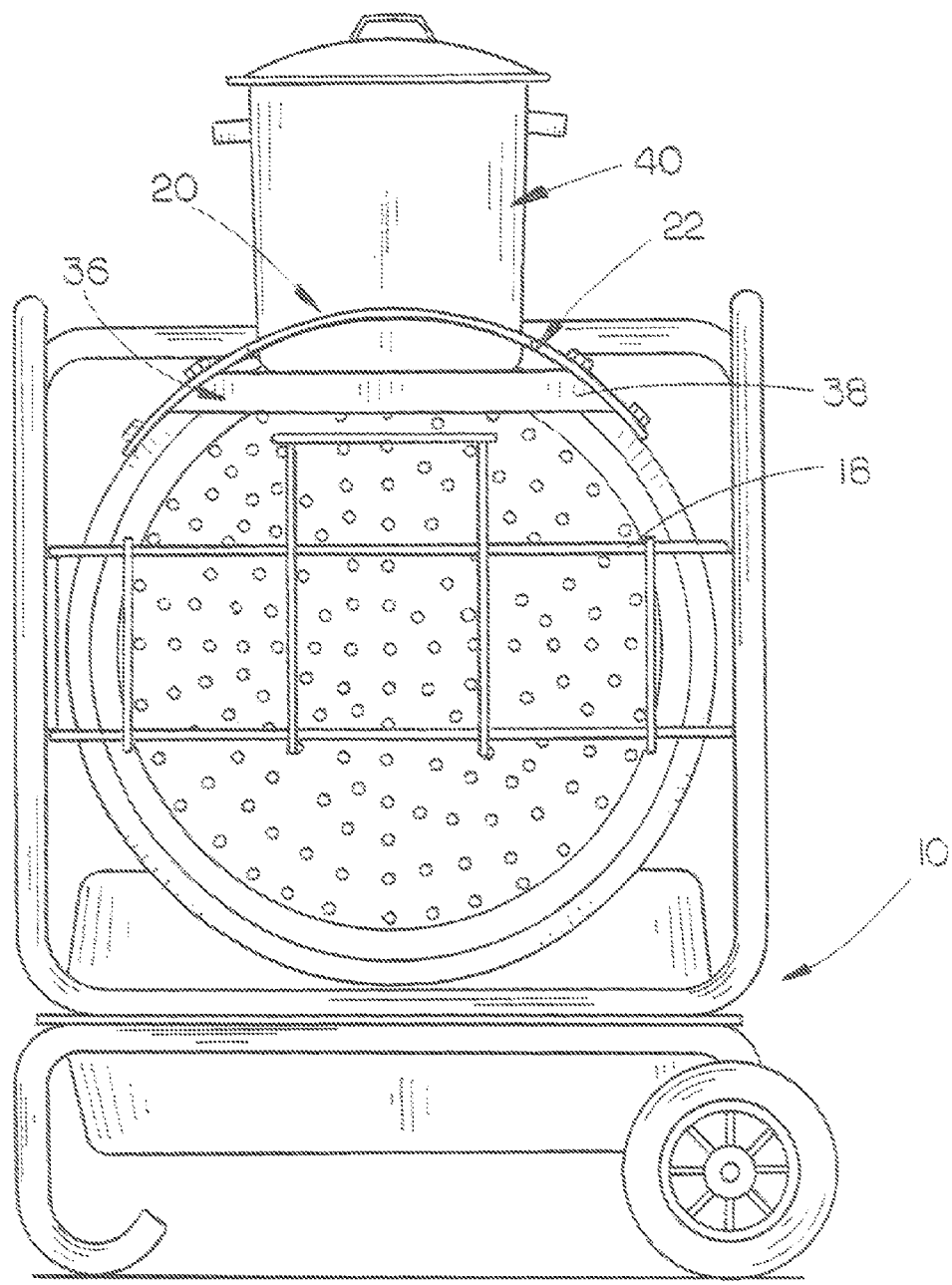
FIG. 7 is a front view of the apparatus of this invention mounted on an infrared heater with the apparatus of this invention supporting a cooking utensil thereon.

The apparatus of this invention is designated by the reference numeral 20. Apparatus 10 includes a downwardly curved, metal visor or deflector 22. Visor 22 includes a central portion 24 and side portions 26 and 28. A cooking utensil opening 30 is formed in visor 22. Visor 22 will be described as having an outer surface 32 and an inner surface 34. Apparatus 20 also includes a cooking utensil support 36 which is comprised of a plurality of elongated, spaced-apart support grid members or vanes 38. The opposite ends of the vanes 38 are welded to the inner surfaces of side portions 26 and 28 and extend therebetween below opening 30. As best seen in FIG. 3, the vanes 38 are disposed at an angle so that the infrared rays passing through visor 22 will be deflected upwardly and outwardly by the vanes onto a cooking utensil 40 such as a pot or kettle which is positioned in the opening 30 and supported on the vanes 38.

When it is desired to heat water or other liquids, the liquids are placed in the cooking utensil 40 with the utensil 40 being positioned in the opening 30 and supported on vanes 38. The heater 10 is then energized so that the infrared rays being emitted from the radiation disk 14 will impinge on the vanes 38 which direct the rays upwardly into contact with the lower end of the utensil 40. The heating of the liquid in the utensil 40 occurs rapidly due to the intense heat applied to the utensil 40. When the contents of the utensil 40 have been sufficiently heated, the utensil 40 is removed from the visor 22. The apparatus of this invention may not only be used to heat water or soup but to cook other foods as well such as stew, roasts, etc.

Thus it can be seen that the invention accomplishes all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. An apparatus for heating or cooking food or the like, comprising:
    an infrared heater having a discharge end;
    said infrared heater including a radiation disk, having an upper end, at said discharge end thereof;
    said radiation disk emitting infrared rays therefrom when said heater is energized;
    a downwardly curved visor-like deflector positioned at said upper end of said radiation disk which extends outwardly therefrom;
    said deflector having inner and outer surfaces;
    said deflector having an upwardly presented cooking utensil opening formed therein;
    and a horizontally disposed cooking utensil support secured to said deflector at said inner surface thereof below said cooking utensil opening;
    said cooking utensil support dwelling in a plane below said upper end of said radiation disk whereby infrared rays being emitted from said radiation disk will impinge upon said cooking utensil support to cook or heat the contents of a cooking utensil positioned on said cooking utensil support.

2. The apparatus of claim 1 wherein said cooking utensil support comprises a plurality of spaced-apart elongated grid members.

3. The apparatus of claim 2 wherein said grid members comprise angled vanes which direct infrared rays upwardly onto the utensil positioned thereon.

4. The apparatus of claim 2 wherein said elongated grid members are transversely disposed with respect to said radiation disk.

5. The apparatus of claim 2 wherein said elongated grid members are welded to said inner surface of said deflector.

6. An apparatus for cooking or heating products through the use of an infrared heater including a radiation disk, having an upper end, at the discharge end thereof from which infrared rays are emitted therefrom, comprising:
    a downwardly curved deflector positioned at the upper end of the radiation disk which extends outwardly therefrom;
    said deflector having inner and outer surfaces;
    said deflector having an upwardly presented cooking utensil opening formed therein;
    and a horizontally disposed cooking utensil support secured to said deflector at said inner surface thereof below said cooking utensil opening;
    said cooking utensil support dwelling in a plane below said upper end of said radiation disk whereby infrared rays being emitted from said radiation disk will impinge upon said cooking utensil support to cook or heat the contents of a cooking utensil positioned on said cooking utensil support.

7. The apparatus of claim 6 wherein said cooking utensil support comprises a plurality of spaced-apart elongated grid members.

8. The apparatus of claim 7 wherein said grid members comprise angled vanes which direct infrared rays upwardly onto the utensil positioned thereon.

9. The apparatus of claim 7 wherein said elongated grid members are transversely disposed with respect to said radiation disk.

10. The apparatus of claim 7 wherein said elongated grid members are welded to said inner surface of said deflector.

11. A method for cooking or heating the contents of a cooking utensil, comprising the steps of:
    providing an infrared heater including a radiation disk, having an upper end, which emits infrared rays therefrom;
    providing a downwardly curved visor-like deflector having inner and outer surfaces;
    forming an upwardly presented cooking utensil opening in the deflector;
    securing a cooking utensil support to the inner surface of the deflector below the cooking utensil opening in the deflector;
    securing the deflector to the infrared heater so that the deflector is positioned at the upper end of the radiation disk;
    placing the product to be heated or cooked in a cooking utensil;
    placing the cooking utensil into the cooking utensil opening so as to be supported on the cooking utensil support; and
    energizing the heater so that infrared rays are directed onto the cooking utensil support and the cooking utensil to cook or heat the contents of the cooking utensil.

\* \* \* \* \*